(12) United States Patent
Schmatz

(10) Patent No.: US 10,780,339 B2
(45) Date of Patent: Sep. 22, 2020

(54) LOWER FLANGE HAVING A BRACKETING EFFECT

(71) Applicant: Völkl Sports GmbH, Straubing (DE)

(72) Inventor: Max Schmatz, Sankt Englmar (DE)

(73) Assignee: Völkl Sports GmbH & Co. KG, Straubing (DE)

(*) Notice: Subject to any disclaimer, the term of this patent is extended or adjusted under 35 U.S.C. 154(b) by 0 days.

(21) Appl. No.: 15/855,000

(22) Filed: Dec. 27, 2017

(65) Prior Publication Data
US 2018/0185736 A1    Jul. 5, 2018

(30) Foreign Application Priority Data

Dec. 29, 2016 (DE) .................. 10 2016 125 895
Nov. 3, 2017 (DE) .................. 10 2017 125 770

(51) Int. Cl.
| A63C 5/12 | (2006.01) |
|---|---|
| A63C 5/04 | (2006.01) |
| B32B 3/04 | (2006.01) |
| B32B 7/12 | (2006.01) |
| A63C 5/048 | (2006.01) |

(52) U.S. Cl.
CPC ............ *A63C 5/126* (2013.01); *A63C 5/0405* (2013.01); *A63C 5/048* (2013.01); *A63C 5/12* (2013.01); *B32B 3/04* (2013.01); *B32B 7/12* (2013.01)

(58) Field of Classification Search
CPC ....... A63C 5/126; A63C 5/0405; A63C 5/048; A63C 5/12; B32B 3/04; B32B 7/12
USPC ............. 280/608, 609, 610, 220, 11.12, 601, 280/286.02
See application file for complete search history.

(56) References Cited

U.S. PATENT DOCUMENTS

| 2,695,178 A * | 11/1954 | Rheinfrank, Jr. ........ A63C 5/12 273/DIG. 7 |
|---|---|---|
| 3,208,761 A * | 9/1965 | Sullivan .................... A63C 5/12 280/610 |
| 3,372,943 A * | 3/1968 | Grossauer ................. A63C 5/12 280/610 |
| 3,503,621 A * | 3/1970 | Schmidt .................... A63C 5/12 280/610 |
| 3,635,482 A * | 1/1972 | Holman .................. A63C 5/048 156/242 |
| 3,901,522 A * | 8/1975 | Boehm ................... A63C 5/075 280/610 |

(Continued)

FOREIGN PATENT DOCUMENTS

| DE | 1901614 A1 | 8/1970 |
|---|---|---|
| EP | 1484091 A1 | 12/2004 |

OTHER PUBLICATIONS

Extended European Search Report for European Application No. 17 210 552.0, dated Jun. 29, 2018, with partial English translation, 8 pages.

*Primary Examiner* — Katy M Ebner
(74) *Attorney, Agent, or Firm* — RatnerPrestia

(57) ABSTRACT

A ski, wherein the ski includes: a ski core; a ski coating which forms an underside of the ski; a lower flange which is arranged between the ski core and the ski coating; steel edges; and side walls; wherein the lower flange includes at least a front region and/or a rear region which is broader, in a direction transverse to a longitudinal axis of the ski, than a distance between the steel edges in the direction transverse to the longitudinal axis of the ski in the region.

12 Claims, 2 Drawing Sheets

(56) References Cited

U.S. PATENT DOCUMENTS

| | | | | |
|---|---|---|---|---|
| 4,094,528 A * | 6/1978 | Cluzel | A63C 5/12 | 280/610 |
| 4,671,529 A * | 6/1987 | LeGrand | A63C 5/04 | 280/610 |
| 4,706,985 A * | 11/1987 | Meatto | A63C 5/126 | 280/610 |
| 4,781,395 A * | 11/1988 | Fischer | A63C 5/12 | 280/610 |
| 4,858,945 A * | 8/1989 | Kashiwa | A63C 5/12 | 280/610 |
| 4,911,462 A * | 3/1990 | Diard | A63C 5/12 | 280/607 |
| 4,928,989 A * | 5/1990 | Mayr | A63C 5/12 | 280/610 |
| 4,953,884 A * | 9/1990 | Diard | A63C 5/04 | 280/601 |
| 4,953,885 A * | 9/1990 | Comert | A63C 5/12 | 280/610 |
| 4,961,592 A * | 10/1990 | Diard | A63C 5/04 | 280/601 |
| 5,002,300 A * | 3/1991 | Pascal | A63C 5/0411 | 280/602 |
| 5,002,301 A * | 3/1991 | Cagneux | A63C 5/075 | 280/601 |
| 5,292,148 A * | 3/1994 | Abondance | A63C 5/07 | 280/602 |
| 5,458,358 A * | 10/1995 | Garcin | A63C 5/00 | 280/608 |
| 5,496,053 A * | 3/1996 | Abondance | A63C 5/0411 | 280/609 |
| 5,672,216 A * | 9/1997 | Robic | B21D 47/00 | 148/527 |
| 5,678,841 A * | 10/1997 | Bauvois | A63C 5/07 | 280/608 |
| 5,855,389 A * | 1/1999 | Andrus | A63C 5/03 | 280/14.22 |
| RE36,453 E * | 12/1999 | Abondance | A63C 5/07 | 280/609 |
| 6,059,308 A * | 5/2000 | Baudin | A63C 5/048 | 280/14.21 |
| 6,102,428 A * | 8/2000 | Bobrowicz | A63C 5/003 | 280/607 |
| 6,193,244 B1 * | 2/2001 | Vance | A63C 5/03 | 280/14.22 |
| 6,612,605 B2 * | 9/2003 | Andrus | A63C 5/03 | 280/14.21 |
| 6,755,434 B2 * | 6/2004 | Deborde | A63C 5/12 | 280/602 |
| 6,851,699 B2 * | 2/2005 | DeRocco | A63C 5/03 | 280/602 |
| 6,994,369 B2 * | 2/2006 | Restani | A63C 5/12 | 280/602 |
| 7,073,811 B2 * | 7/2006 | Puget | A63C 5/0411 | 280/11.12 |
| 7,275,756 B2 * | 10/2007 | Turner | A63C 5/126 | 280/610 |
| 7,314,227 B2 * | 1/2008 | Sanders | A63C 5/03 | 280/11.14 |
| 8,967,655 B2 * | 3/2015 | Grilc | A63C 5/003 | 280/602 |
| 2001/0022439 A1 | 9/2001 | Andrus et al. | | |
| 2002/0105165 A1 * | 8/2002 | DeRocco | A63C 5/03 | 280/608 |
| 2002/0158431 A1 * | 10/2002 | Porte | A63C 5/03 | 280/14.22 |
| 2005/0167948 A1 * | 8/2005 | Riepler | A63C 5/003 | 280/610 |
| 2007/0018431 A1 * | 1/2007 | Turner | A63C 5/12 | 280/610 |

* cited by examiner

LOWER FLANGE HAVING A BRACKETING EFFECT

CROSS REFERENCE TO RELATED APPLICATION

This application claims priority to German Application No. 10 2016 125 895.4, filed Dec. 29, 2016 and German Application No. 10 2017 125 770.5, filed Nov. 3, 2017, the contents of such applications being incorporated by reference herein.

FIELD OF THE INVENTION

The invention relates to a ski comprising at least: a ski core; a ski coating which forms an underside of the ski; a lower flange which is arranged between the ski core and the ski coating; steel edges; and side walls which are for example arranged between the ski core and an upper side of the steel edges which faces the ski core. In accordance with the invention, the flat lower flange is broader, at least before it is incorporated into the ski as a flat body and at least in a region of the ski in a direction transverse to the ski, than a distance between the steel edges and the ski in the transverse direction in said region. The invention also relates to a lower flange having a bracketing effect.

BACKGROUND OF THE INVENTION

The demands of customers on sports equipment, particularly if they are good skiers, are constantly rising, whether it is the weight of the ski, its dynamic characteristics during descent, or simply just its visual appearance. At the same time, the texture of the snow also varies, for example due to artificial snow-making, hence there is a constant effort to optimally design and equip the sports equipment in order to both satisfy old customers and gain new ones. One aspect which can be improved is the transmission of force from the ski into the substrate during edging.

SUMMARY OF THE INVENTION

An aspect of the invention provides a ski which has been optimised in its design in order to enable an improved transmission of force and better grip during edging. Another aspect provides a modified component part for the ski.

A first aspect of the invention relates to a ski, wherein the ski comprises at least: a ski core; a ski coating; a lower flange; side walls; and steel edges. The ski can optionally comprise a cover and an upper flange.

In a sectional view starting at the top, the ski comprises: an optional cover which forms an upper side of the ski; a ski core which for example substantially forms the body of the ski; an optional upper flange which is arranged between the ski core and the cover; a ski coating which forms an underside of the ski; a lower flange which is arranged between the ski core and the ski coating; steel edges; and side walls which are for example arranged between the ski core and an upper side of the steel edges which faces the ski core, wherein the side walls are parts of the ski core or can be connected to the ski core, or are separate side walls of the ski. The side walls are preferably separate parts. The ski can optionally comprise another lower flange which lies between the two steel edges.

The lower flange is broader, at least in a region of the ski in a direction transverse to the ski, than a distance between the steel edges or, respectively, the mutually facing ends of the steel edges, or between the steel edges in the direction transverse to the ski in said region, wherein the breadth of the flat lower flange, i.e. the lower flange which lies on a flat substrate over its whole surface, is broader than the distance described. The term "flat lower flange" is to be understood here to mean a lower flange which is two-dimensional, like a box before it is folded, and which does not exhibit any three-dimensional deformations.

The ski comprising the lower flange in accordance with the invention has the advantage that it offers better grip during edging and that the transmission of force from the ski onto the substrate is optimised.

An outer or circumference shape of the lower flange can be embodied such that the lower flange extends as far as an upper side of the side wall or walls, respectively, which faces away from the steel edges, in at least a longitudinal portion of the ski on at least one side and preferably both sides, i.e. in the region above the ski coating, the lower flange can extend parallel to the ski coating as far as an inner side, i.e. a side of the side wall(s) which faces away from the outer side of the ski, then parallel to the inner side of the side wall(s) in the vertical direction over the entire height of the inner side of the side wall(s), and finally terminate parallel to the upper side of the side wall(s) which faces the ski core, between the ski core and the upper side of the side wall(s) which faces the ski core.

In other words, the lower flange extends up to and onto an upper side of the side walls which faces away from the steel edges, preferably as far as an outer edge of said upper side, at least in the at least one longitudinal portion of the ski and preferably on both sides.

The longitudinal portion comprising the broadened portion of the lower flange can for example be a region of the ski which is a front and/or rear region in the skiing direction, comprising a normal region which is situated in front of, behind or between the front and/or rear region and in which the flat lower flange is not broader than a distance between the two mutually facing sides of the steel edges of the ski. The longitudinal portion can also be the ski over its entire length or at least a large portion of its length, for example less the tip and the trailing end. The exact longitudinal extension of the longitudinal portion(s) is not fixed and can be selected by the person skilled in the art, when designing a ski, such that the demands made on the ski are met.

A lower flange which is incorporated in the ski as described above thus exhibits a bracketed or finned shape, in a cross-sectional view transverse to the longitudinal axis of the ski, in the longitudinal portion(s) or selected region(s), wherein the free ends of the bracket or fins are arranged between the ski core and the upper side of the side walls which faces the ski core, in the finished ski, wherein in said region, the free ends can overlap the entire breadth of the upper side of the side walls which faces the ski core, or only overlap partially, or protrude outwards beyond the side walls.

The lower flange can be a single-part semi-finished product which is for example punched or cut out of a flat, flexible material. When manufacturing the ski, the single-part lower flange can then for example be placed in a mould after the ski coating, the steel edges and the side walls. The ski core can then be placed in the mould, wherein the ski core then presses the lower flange into the position described above. In order to assist the shaping of the lower flange, the lower flange can exhibit integrated flexing lines, for example in the form of local material attenuation, perforation, etc. An adhesive such as a glue can be inserted between the individual layers, which is then cured in the mould while supplying pressure and/or heat, thus connecting the parts placed in the mould.

If the material for the lower flange is a relatively rigid sheet material, the punched or cut lower flange, which may be provided with flexing lines, can for example be deformed in a press, with or without the supply of additional heat, in a corresponding die before the lower flange can be used for further processing in the production of skis.

Alternatively, the lower flange can comprise multiple parts. The lower flange can for example comprise a first part which extends substantially over the entire ski in the region of the ski coating in the longitudinal direction between the steel edges, for example like a classic lower flange in skis of the prior art. This lower flange shall be referred to in the following as the other lower flange, to distinguish it linguistically from the lower flange in accordance with the invention, referred to as the lower flange for short. Alternatively, the other lower flange can comprise material-saving constrictions in said region(s), or the portions of the other lower flange which lie in said region(s) can be connected to each other by one or more bridges only. This enables weight savings and can lower the manufacturing cost of the ski.

The multiple-part lower flange comprises a second part and optionally a third part or subsequent parts which form/s the broadened portion(s) of the lower flange or the bracket or fins in the one or two or more region(s) of the ski. The second or subsequent parts are preferably placed over the other lower flange exclusively in said region or regions. They preferably extend substantially over the length of the region or regions in the longitudinal direction of the ski and transverse thereto up to and onto the upper side of one or both side walls which faces the ski core, as has been described in detail above. The other lower flange and the second, third, etc. part can collectively form or, respectively, emulate the lower flange described above.

The second and/or each subsequent part of the lower flange comprises a middle part which can be joined, for example glued, to the other lower flange. This gluing step can be performed outside of the mould mentioned above, i.e. prior to producing the ski, or not until after it has been placed in the mould and possibly then heated and/or pressurised. The second part or any of the subsequent parts can also be cropped in a material-saving way.

The lower flange, irrespective of whether it comprises one or multiple parts, can consist of a single material or comprise two or more materials. In a single-part lower flange, composite materials can for example be used; in a two-part or multiple-part lower flange, the first part can be formed from a first material and the second and any subsequent parts from a second material, or the second part can be formed from a second material, the third part from a third material, etc. The first material and the second, third, etc. material can again be different composite materials.

Another aspect of the invention relates to a lower flange and/or other lower flange and its constituent first, second, third, etc. parts, such as is/are for example stockpiled in a warehouse, as a component part of a ski. With respect to the second aspect, only the lower flange is dealt with in the following, wherein the same applies with respect to the other lower flange and the parts.

The lower flange has an elongated basic shape, for example a length which substantially corresponds to a length of the ski coating of the ski for which the lower flange is to be used. The basic shape comprises longitudinal portions or regions in which a breadth transverse to the longitudinal axis of the ski substantially corresponds to the breadth of the ski, and at least one region or longitudinal portion comprising fin-shaped broadened portions transverse to the longitudinal direction, such that the flat, two-dimensional lower flange exhibits a greater breadth in one or two or more regions than the ski for which it is to be used does in the same region or regions. These regions can in particular be the regions of the ski which lie in front of and/or behind the ski binding in the longitudinal direction of the ski. Said region can however also be the entire region in which the ski comprises side walls. Consequently, the lower flange can be broader than the ski coating of the ski for which it is used, in a region in front of the ski binding and/or in a region behind the ski binding or also over substantially its entire length, with the possible exception of the ski tip and/or the end of the ski which faces away from the ski tip.

The lower flange can for example be the lower flange described with respect to the first aspect.

BRIEF DESCRIPTION OF THE DRAWINGS

Example embodiments of a ski in accordance with aspects of the invention and of lower flanges in accordance with aspects of the invention shall be described in more detail in the following on the basis of figures. Features essential to the invention which can only be gathered from the figures form part of the scope of the invention and can advantageously develop, individually or in combinations shown. The figures show.

DETAILED DESCRIPTION OF THE INVENTION

Figure 1:
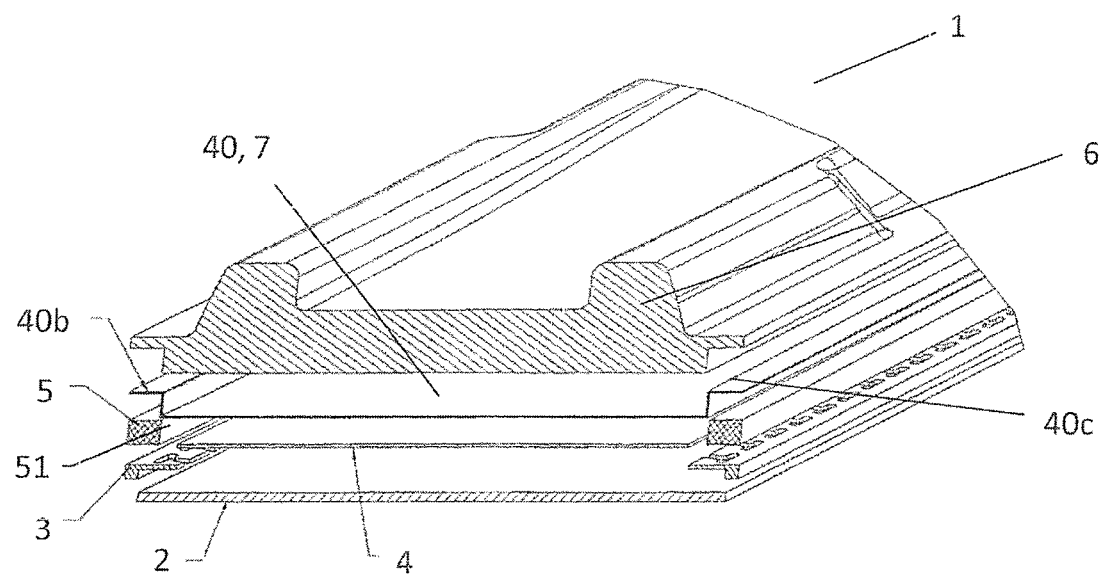
FIG. 1 the essential component parts of a ski in accordance with the invention, separated from each other.

FIG. 1 shows the essential parts which a ski 1 according to an aspect of the invention comprises. The individual parts are shown separately from each other in a sectional view through a binding region of the ski 1. The ski 1 comprises a ski coating 2, steel edges 3, another lower flange 4, side walls 5, a lower flange 40 or a part of it, and a ski core 6. The ski 1 can optionally also comprise an upper flange (not shown) and a cover (not shown) which forms the visible upper side of the ski.

As can be seen, the other lower flange 4 is cropped such that it can be placed onto the ski coating 2 between the steel edges 3. The lower flange 40 is shaped such that its middle part 7 lies on the other lower flange 4. The ends 40b, 40c of the lower flange 40 which point transverse to the longitudinal axis of L the ski are bracket-shaped, such that they can abut the respective side wall 5 on an inwardly facing longitudinal side 51 and on the upper side 52.

Figure 2:
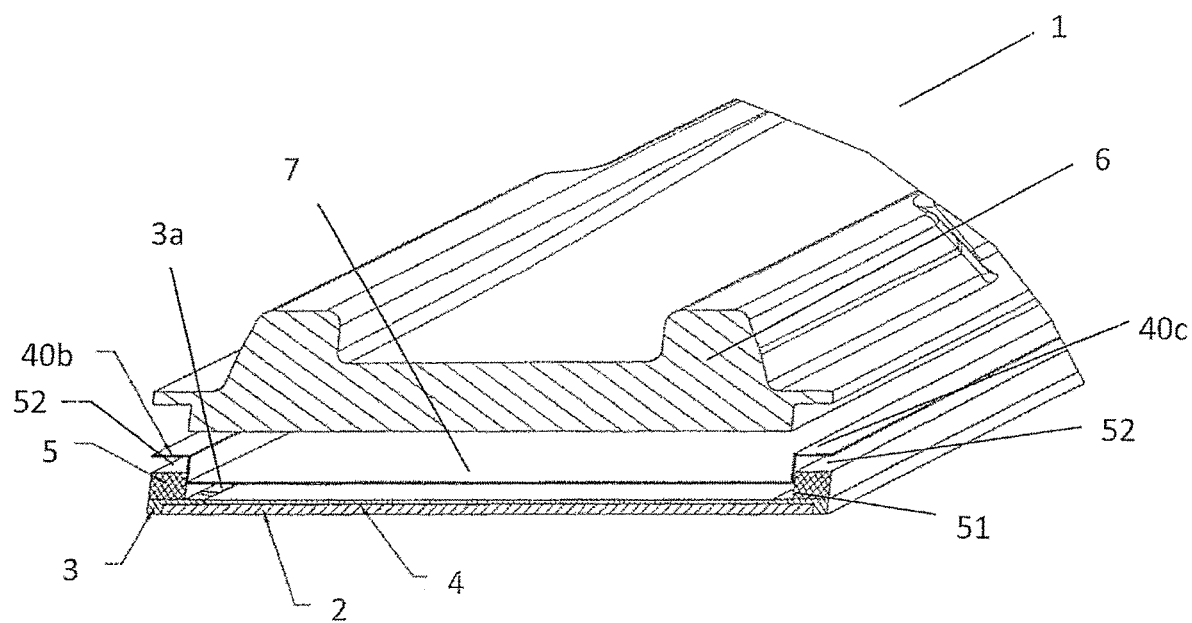
FIG. 2 the parts from FIG. 1, partially connected to each other.

FIG. 2 shows the ski 1 in a partially assembled state. The steel edges 3 are lying on the ski coating 2, the other lower flange 4 is lying on the ski coating 2, and the side walls 5 are lying on an upper side 3a of the steel edges 3. The lower flange 40 is not yet in place; however, it can be clearly seen that the middle part 7 will lie on the other lower flange 4 and on an upper side 3a of the steel edges 3, and the lateral ends 40b, 40c of the lower flange 40 will lie on or, respectively, abut the longitudinal side 51 and the upper side 53 of the respective side wall 5.

Figure 3:
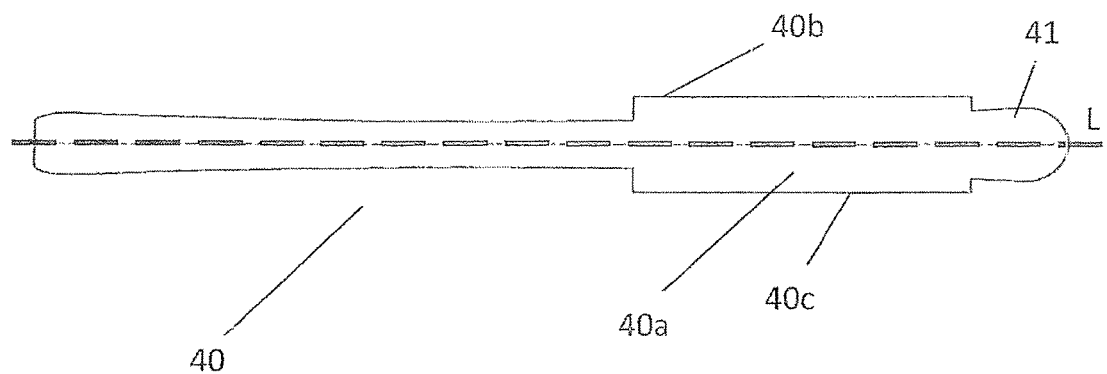
FIG. 3 a first example embodiment of a lower flange in accordance with the invention, as a semi-finished product.

FIG. 3 shows a plan view of a lower flange 40 of a first example embodiment comprising a region 40a, which is a front region in the skiing direction or longitudinal direction L of the ski, and the sides 40b, 40c. As shown, the lower flange 40 can be punched or cut out of a two-dimensional, i.e. flat, mat or sheet material. If the material is flexible enough, it is possible to deform it only once the ski 1 is being assembled; or if the material can be cured, it can for example be pre-formed by supplying heat and/or applying pressure. If it is a rigid material, then the lower flange 40 can for example be deformed and/or pre-formed in a press, with or without supplying heat, before it is incorporated into the ski 1.

Figure 4:
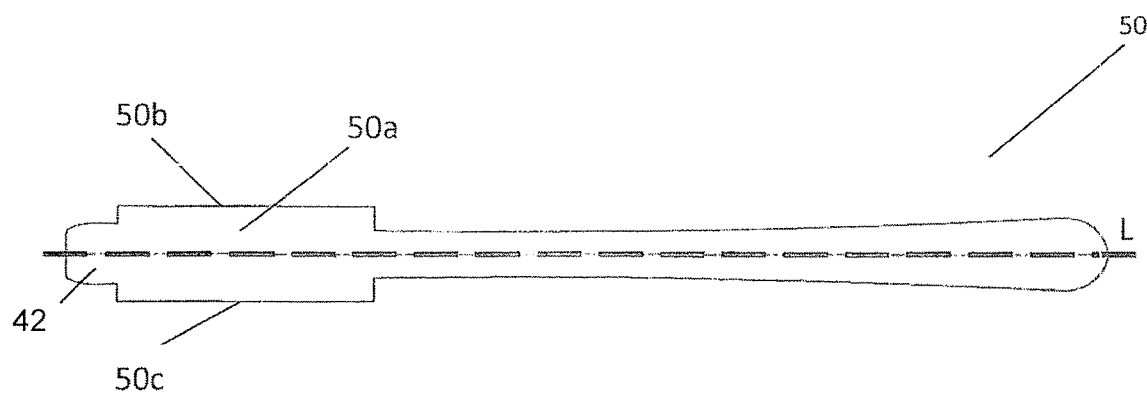
FIG. 4 a second example embodiment of a lower flange in accordance with the invention, as a semi-finished product.

FIG. 4 shows a plan view of a lower flange 50 of a second example embodiment comprising a region 50a, which is a rear region in the skiing direction or longitudinal direction L of the ski, and the sides 50b, 50c. As can be seen, the rear region 50a terminates in front of the rear end of the lower flange 50.

Figure 5:
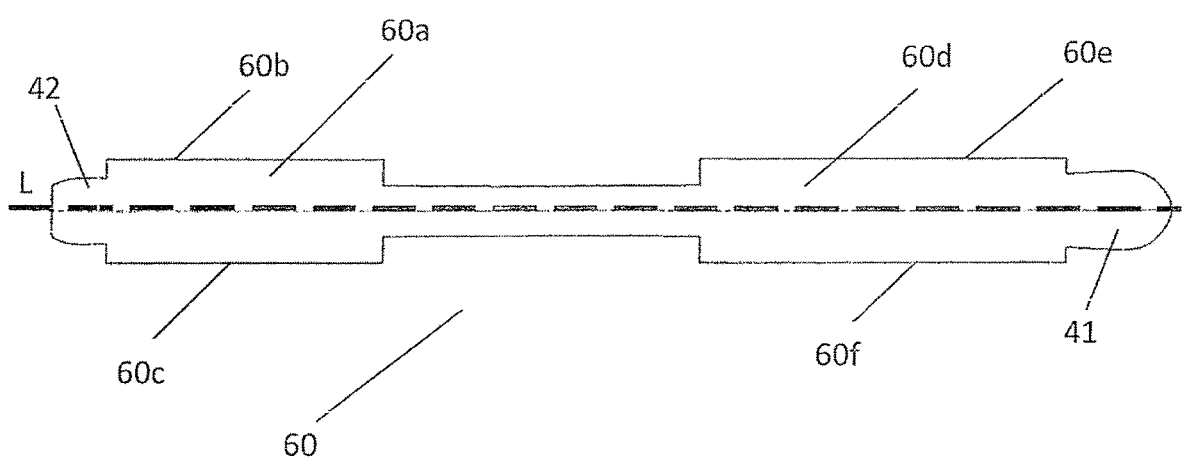
FIG. 5 a third example embodiment of a lower flange in accordance with the invention, as a semi-finished product.

Finally, FIG. 5 shows a plan view of a lower flange 60 comprising a front region 60a including the sides 60b, 60c, and a rear region 60d including the sides 60e, 60f. Between the front region 60a and the rear region 60d, the breadth of the lower flange 60 as measured transverse to the skiing direction corresponds to the breadth of the other lower flange 4, such as has been described with respect to FIGS. 1 and 2. This intermediate region can for example comprise the region in which a ski binding or a separate front jaw and a separate rear jaw can be connected to the ski 1.

A longitudinal extension of the front regions 40a, 60a and rear regions 50a, 60d can be freely selected, meaning that they can also extend into the region in which the ski binding or the ski retaining units can be connected to the ski. The tip 41 and the end 42 of the lower flange 40 can still be part of the front region 40a; 60a or rear region 50a; 60d. Finally, it is also possible for the lower flange 40 to extend over the entire length of the ski or other lower flange 4.

LIST OF REFERENCE SIGNS 1 ski
2 ski coating
3 steel edge
3a upper side of the steel edge
4 other lower flange
40 lower flange
40a front region
40b lateral end
40c lateral end
41 tip
42 end
5 side wall
50 lower flange
50a rear region
50b lateral end
50c lateral end
51 longitudinal side of the side wall
52 upper side of the side wall
6 ski core
60 lower flange
60a front region
60b lateral end
60c lateral end
60d rear region
60e lateral end
60f lateral end
7 middle part
L longitudinal axis of the ski

The invention claimed is:

1. A ski, comprising:
a ski core;
a ski coating which forms an underside of the ski;
a lower flange which is arranged between the ski core and the ski coating;
steel edges; and
side walls;
wherein the lower flange comprises at least one of:
a front region which is broader, in a direction transverse to a longitudinal axis of the ski, than a distance between the steel edges in the direction transverse to the longitudinal axis of the ski in a respective front region of the ski, and
a rear region which is broader, in a direction transverse to a longitudinal axis of the ski, than a distance between the steel edges in the direction transverse to the longitudinal axis of the ski in a respective rear region of the ski;
wherein the at least one of the front region and the rear region of the lower flange has a first portion extending between the ski core and the ski coating in the direction transverse to the longitudinal axis of the ski parallel to the ski coating as far as to inner sides of the side walls, a pair of second portions extending from the first portion between the ski core and respective ones of the side walls parallel to said inner sides of the side walls in a general vertical direction over the entire height thereof, and a pair of third portions forming uppermost surfaces of the lower flange and extending from respective ones of the pair of second portions between the ski core and the respective ones of the side walls parallel to an upper side of said side walls, wherein the uppermost surfaces of the lower flange face a lower surface of the ski core.

2. The ski according to claim 1, wherein the lower flange comprises multiple parts, including: a first part which extends between the steel edges in the longitudinal direction of the ski, in the region of the ski coating, substantially over the entire ski; and a second part which forms the broadened portion in the front region and/or rear region.

3. The ski according to claim 2, wherein the second part of the lower flange comprises a middle part which is joined to the first part over the whole surface of the middle part.

4. The ski according to claim 1, wherein the lower flange consists of a single material or of several materials.

5. The ski according to claim 2, wherein the multiple parts consist of i) a same material, ii) same materials, or iii) partially different materials.

6. A lower flange for incorporating in a ski comprising at least a ski core, a ski coating which forms the underside of the ski, steel edges and side walls, wherein the lower flange exhibits a broadness in a direction transverse to its longitudinal axis in at least one of a front region and a rear region, which corresponds at least to a distance between two mutually facing sides of the steel edges plus an entire height of an inner side of at least one of the two side walls,
wherein the lower flange has a first portion extending between the ski core and the ski coating in the direction transverse to the longitudinal axis of the ski parallel to the ski coating as far as to inner sides of the side walls, a pair of second portion portions extending from the first portion between the ski core and respective ones of the side walls parallel to said inner sides off of the side walls in a general vertical direction over the entire height thereof, and a pair of third portion portions forming uppermost surfaces of the lower flange and extending from respective ones of the pair of second portion portions between the ski core and the respective ones of the side walls parallel to an upper side of said side walls, wherein the uppermost surfaces of the lower flange faces a lower surface of the ski core.

7. The lower flange according to claim 6, wherein the lower flange is designed for being arranged between the core of the ski and a coating of the ski.

8. The ski according to claim 1, wherein the lower flange comprises multiple parts, including: a first part which extends between the steel edges in the longitudinal direction of the ski, in the region of the ski coating, substantially over the entire ski; and at least a second part which forms the broadened portion of the lower flange in the front region or in the rear region.

9. The ski according to claim 8, wherein the second part of the lower flange comprises a middle part which is joined to the first part over its whole surface.

10. The ski according to claim 9, wherein the first part and the second part consist of i) a same material, ii) same materials, or iii) partially different materials.

11. The ski according to claim 8, wherein the lower flange further comprises a third part which forms the broadened portion of the lower flange in another one of the front region or in the rear region separate from the second part.

12. The ski according to claim 11, wherein the second part and/or the third part of the lower flange comprises a middle part which is joined to the first part over its whole surface.

* * * * *